(12) United States Patent
Watase et al.

(10) Patent No.: US 6,365,261 B1
(45) Date of Patent: Apr. 2, 2002

(54) MAGNETIC RECORDING MEDIUM

(75) Inventors: Shigeharu Watase; Yutaka Takahashi, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/562,543

(22) Filed: May 2, 2000

(30) Foreign Application Priority Data

May 12, 1999 (JP) ............................................ 11-131329

(51) Int. Cl.$^7$ ................................................. B32B 3/10
(52) U.S. Cl. .............. 428/141; 428/474.4; 428/694 ST; 428/694 SC; 428/694 TR; 428/694 BR
(58) Field of Search ........................ 428/474.4, 694 ST, 428/694 TR, 694 BR, 141, 694 SL

(56) References Cited

U.S. PATENT DOCUMENTS 5,804,283 A * 9/1998 Inaba et al. .................. 428/141
6,180,254 B1 * 1/2001 Handa et al. ............ 428/474.4

FOREIGN PATENT DOCUMENTS

| JP | 6-68449 | 3/1994 |
| JP | 10-204188 | 8/1998 |

* cited by examiner

*Primary Examiner*—Paul Thibodeau
*Assistant Examiner*—Kevin M. Bernatz
(74) *Attorney, Agent, or Firm*—Akin, Gump, Strauss, Hauer & Feld, L.L.P.

(57) ABSTRACT

A conventional film-type magnetic recording medium having a overall thickness of 7 μm or less has unsatisfactory stiffness, and when surface undulations are suppressed and the thickness of the substrate is reduced, clogging at the rotary head is frequently observed. The invention solves this problem by a tape-type magnetic recording medium which comprises a nonmagnetic substrate and at least a magnetic layer thereon and has the overall thickness of 7 μm or less, wherein the width of the tape is 6.5 mm or more and the difference in the centerplane average roughness (SRa) of said magnetic layer is in the range defined below:

3 nm≦SRa (Cutoff: 800 μm)–SRa (Cutoff: 80 μm)≦15 nm

Especially, the nonmagnetic substrate is an aromatic polyamide.

5 Claims, No Drawings

MAGNETIC RECORDING MEDIUM

BACKGROUND OF THE INVENTION

1. Field of the Invention

The present invention relates to a magnetic recording medium, and particularly to a tape-type magnetic recording medium having an extremely small overall thickness, such as 7 μm or less.

2. Prior Art

With respect to a magnetic recording medium, it is desired that the overall thickness be maintained as small as possible for the purpose of attaining a large recording capacity. In addition, many attempts have been made to obtain a magnetic layer =having a smooth surface, since a high recording density has also been demanded. For example, Japanese Patent Application Kokai No. 6-68449 discloses that a magnetic recording medium having an extremely smooth and even surface and a remarkable improvement in electromagnetic transducing property by preparing a substrate having a value of 10 nm or less as obtained by subtracting Ra (Cut off: 0.08 mm) from Ra (Cut off: 0.25 mm) which results in the suppression of surface undulations, applying a lower or undercoat nonmagnetic or magnetic layer on the substrate which offsets the surface roughness of the substrate, and forming an upper magnetic layer which is applied by Wet on Wet method on the lower layers. Japanese Patent Application Kokai No. 10-204188 discloses a heat-resistant synthetic resin film in which fine particles having a specific particle size are dispersed, wherein the film has mild undulations across the surface of the film analogous to two dimensional sine curves by regulating the centerplane average roughness (SRa). However, there are no mentioning to the application to a magnetic recording medium, and the value of SRa is outside that of the present invention, thus the desired effect cannot be expected.

PROBLEMS TO BE SOLVED BY THE INVENTION

On the other hand, the material for the substrate disclosed in Example of Japanese Patent Application Kokai No. 6-68449 is polyethylene terephthalate (PET) and when the thickness of the substrate is reduced, stiffness becomes unsatisfactory. In addition, when the difference in Ra of the substrate is regulated as mentioned above in order to suppress undulations and the thickness of the substrate is reduced, clogging of the gap at the rotary head is frequently observed.

Accordingly, the object of the present invention is to provide a film-type magnetic recording medium having a overall thickness of 7 μm or less which prevents clogging and exhibits excellent electromagnetic transducing property.

SUMMARY OF THE INVENTION

The above-mentioned problems can be solved by the present invention which is:

(1) A tape-type magnetic recording medium which comprises a nonmagnetic substrate and at least a magnetic layer thereon and has an overall thickness of 7 μm or less, having a width of the tape of 6.5 mm or more and the difference in the centerplane average roughness (SRa) of the magnetic layer is in the range defined below:

3 nm≦SRa (Cutoff: 800 μm)–SRa (Cutoff: 80 μm)≦15 nm.

(2) a magnetic recording medium according to the item (1) above, wherein the nonmagnetic substrate is made of an aromatic polyamide.

PREFERRED EMBODIMENT OF PRESENT INVENTION

According to the present invention, by regulating the difference in the centerplane average roughness (SRa) of the magnetic layer in the range defined below, a magnetic recording medium which exhibits excellent durability and prevents clogging at the head, even when the overall thickness of the tape-type medium is 7 μm or less, can be obtained.

3 nm≦SRa (Cutoff: 800 μm)–SRa (Cutoff: 80 μm)≦15 nm where SRa is defined as follows. A roughness surface is obtained by three-dimensionally extending a roughness curve defined by JISB0601. (JIS means Japanese Industrial Standard) and a centerplane is obtained by three-dimensionally extending a centerline also defined by JISB0601. X axis and Y axis (rectangular coordinates) are placed on the centerplane and Z axis is placed perpendicularly to the centerplane. A certain area $S_M$ ($=L_x \times L_y$) on the centerplane is selected. Height f(x,y) of the surface as measured from the centerplane at each point (x,y) within the area $S_M$ SRa is defined by the following formula (unit: μm):

$$SRa = \frac{1}{S_M} \int_0^{L_x} \int_0^{L_y} |f(x, y)| \, dx \, dy$$

Especially when the overall thickness is less than 6.5 μm, the stiffness becomes unsatisfactory, and therefore, the conventional magnetic tape used having a width of 6.5 mm or more exhibited a poor running property when used in a video tape recorder and it was difficult to obtain a good head touch (i.e. contact condition of a magnetic tape and a head). In contrast, according to the present invention, an excellent running property and an excellent head touch can be attained even when the width of the tape is 6.5 mm or more. In this case, SRa is measured using a measuring device for three-dimensional surface roughness, and the expression "SRa (Cutoff: 800 μm)" means that the measurement was conducted with the cutoff of 800 μm.

In the same manner, the expression "SRa (Cutoff: 80 μm)" means that the measurement was conducted with the cutoff of 80 μm. By means of this measurement, undulations of the magnetic layer as a whole can be measured accurately.

When the difference in SRa [ΔSRa=SRa (Cutoff: 800 μm)–SRa (Cutoff: 80 μm)] is below the above-mentioned range, the undulations of the magnetic layer as a whole become small, and as a result, durability of the tape and prevention of clogging are deteriorated. On the other hand, when the difference in SRa is above the range, the undulations of the magnetic layer as a whole become too large and the electromagnetic transducing characteristics tend to be deteriorated. Accordingly, it is preferred that the lower limit be 4 nm and the upper limit be 13 nm.

As effective methods to obtain ΔSRa in the above-mentioned range, there can be mentioned: a method in which a nonmagnetic substrate having undulations of an appropriate degree is used; and a method in which a calendering roll having undulations of an appropriate degree on its surface is used, in the case that calendering is conducted after applying a magnetic layer onto a nonmagnetic substrate. There also can be mentioned: a method in which minute vibration is applied to a nonmagnetic substrate during the application of a magnetic layer; a method in which the viscosity of the magnetic coating is adjusted; and a method in which a nonmagnetic substrate containing relatively large particles is formed for the purpose of providing undulations on the surface of the nonmagnetic substrate.

As a material for the nonmagnetic substrate, an aromatic polyamide resin is especially preferred. By using this material, the stiffness as a whole can be enhanced and excellent durability and head touch can be attained even when the overall thickness of the magnetic recording medium is below 6.5 μm. As an aromatic polyamide, there can be mentioned a polyamide comprising 50 mol % or more, preferably 70 mol % or more of the repeating unit represented by the following formula:

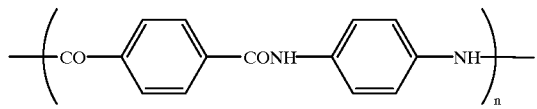

wherein hydrogen atom(s) of the aromatic rings is optionally substituted with substituent(s), such as a halogen group and a nitro group. From a viewpoint of obtaining excellent stiffness, a polymer in which preferably 70% or more, more preferably 80% or more, of the entire aromatic rings are bonded at para-position, is preferred. To the polyamide may be added additives, such as a lubricant such as $SiO_2$, $TiO_2$ and $CaSO_4$ and an antioxidant, as long as they do not deteriorate physical properties of the polyamide. Young's modulus of the nonmagnetic substrate obtained using the aromatic polyamide, as measured at 20° C. and 60% RH, is 19,600 $N/mm^2$ or more, preferably 27,440 $N/mm^2$ or more, in terms of the sum of the value measured in longitudinal direction and that measured in transversal direction.

In order to provide a nonmagnetic substrate with undulations of appropriate degree, a production method described in Example 1 can be used. With respect to the other processes, such as dispersion process and the application process of the magnetic layer and the back-coating layer, and the drying process and the slitting process conducted afterwards, conventional methods can be used, except when a method is specifically explained.

Examples of binders used in a magnetic layer, a back-coating layer and optionally a lower or undercoat layer placed between a magnetic layer and a substrate include a thermoplastic resin, a thermosetting resin, a reaction resin and an electron-sensitive modified resin. They may be used in combination and the combination is suitably selected depending on the properties of the medium and the conditions of the process.

Examples of thermoplastic resins include a combination of a vinyl chloride copolymer and polyurethane resin, a (metha)acrylic resin, a polyester resin and a nitrocellulose resin. Among these resins, a resin having hydroxyl group(s) at the terminal or the side chain thereof is preferred, since such a resin functions as a reaction resin which facilitates a cross-linking utilizing polyisocyanate and an electron cross-linking. Further, a resin may have acidic polar group(s), basic polar group(s) or the like, such as —COOH, —$SO_3H$, —$OSO_3M$, —$OPO_3M$, —$PO_3M$, —$N^+R_3Cl^-$, —$NR_2$ or the like (wherein M represents H or an alkali metal, such as Na and K; and R represents H or a hydrocarbon group) at the terminal or the side chain thereof. A resin containing such group(s) is suitable for improving dispersibility. These resins may be used alone or in combination.

Among these, a combination of a vinyl chloride copolymer and a polyurethane resin is preferred. The polyurethane resin used with the vinyl chloride has advantages in abrasion resistance and adhesion to the substrate. In addition to the above-mentioned resins, conventional resins may be used.

It is possible to use a modified resin obtained by process the above-mentioned resin by a conventional method thereby introducing (metha)acrylic double bonding and modifying electron-sensitivity.

Examples of magnetic particles to be used in the present invention include: powder of magnetic metal such as iron powder containing at least one member selected from cobalt, nickel and rare earth element (including Y); and cobalt and an alloy of cobalt and nickel; powder of magnetic oxide (such as cobalt-containing iron oxide magnetic powder and barium ferrite powder); and other conventional magnetic powders. It is preferred that the particle of magnetic powder be a needle-like particle having a major-axis length of approximately 0.05–0.3 μm or a hexagonal particle having a plate diameter of approximately 0.03–0.2 μm.

EXAMPLES

The present invention is explained below with reference to the following Examples and Comparative Examples.

Example 1

An aromatic polyamide film having undulations (substrate (1)) was prepared in the following manner.

Silica particles having a particle size of 40 nm were dispersed into polyparaphenylene terephthalate so that the content of the silica particles became 0.02%. The dispersion was dissolved into 99.8% vitriol so that the polymer content became 12%. The resultant solution was cast onto an endless belt via a die, so that the thickness of the dried substance becomes 4.5 μm. Subsequently, the dope cast onto the belt was subjected to heating and hygroscopic treatment simultaneously on the belt, thereby to convert the liquid crystal phase of the dope into an isotropic phase. The resultant dope was then allowed to solidify in 40% sulfuric acid at 10° C., thereby obtaining a sheet. The solidified sheet was neutralized and washed with water. The washed sheet was stretched in the longitudinal direction so that the resultant length became 1.1 times as compared with the original length. The length of sheet was fixed to a tenter by holding the sides of the sheet and the sheet was stretched in the transverse direction so that the width became 1.1 times as compared with the original width. While maintaining this size, the sheet was hot-air dried at 200° C., thereby obtaining a film. With respect to the obtained film, SRa1 was 23 nm, SRa2 was 9 nm and ΔSRa was 14 nm. [SRa1=SRa (Cutoff: 800 μm), SRa2=SRa (Cutoff: 80 μm), and ΔSRa=SRa (Cutoff: 800 μm)–SRa (Cutoff: 80 μm). The unit used herein is nm.]

The magnetic layer and the back-coating layer composed of the following components were applied onto the obtained film, thereby forming a magnetic recording medium.

The amount of each component was expressed in terms of parts by weight.

Magnetic layer
Preparation of a Binder Solution

| | |
|---|---|
| Vinyl chloride resin (Nippon Zeon Co., MR-110) | 10 parts |
| Polyester polyurethane resin (Toyobo Co., UR-8300) | 7 parts |
| MEK | 21 parts |
| Toluene | 21 parts |
| Cyclohexanone | 21 parts |

The above-listed components were charged into a hyper mixer and stirred for 6 hours, thereby obtaining a binder solution. The binder solution was subjected to circulation filtration for 8 hours using a depth filter having a 95% cut and filtration precision of 5.0 μm.

Kneading and dispersing process

| Magnetic powder of strong magnetic metal (Hc = 131 kA/m, σs = 125 Am²/kg, specific surface = 60 m²/g, average length of major axis = 0.13 μm) | 100 parts |
|---|---|
| α-Al₂O₃ (HIT-50, manufactured by Sumitomo Chemical Co.) | 8 parts |
| Binder solution | 40 parts |

The above-listed components were charged into a pressure-kneader, and kneading was conducted for 2 hours. After the kneading was completed, the following components were added to the kneaded substance, so that the viscosity became appropriate for dispersion process.

| Binder solution | 40 parts |
|---|---|
| MEK | 15 parts |
| Toluene | 15 parts |
| Cyclohexanone | 15 parts |

After they were mixed, dispersion process was conducted using a sand mill, thereby obtaining slurry.
Process of adjusting viscosity

| Stearic acid | 0.5 part |
|---|---|
| Myristic acid | 0.5 part |
| Butyl stearate | 0.5 part |
| MEK | 65 parts |
| Toluene | 65 parts |
| Cyclohexanone | 65 parts |

The above-listed components were charged into a hyper mixer and stirred for 1 hour, thereby obtaining a liquid for adjusting viscosity. The liquid for adjusting viscosity was subjected to circulation filtration for 8 hours using a depth filter having a 95% cut and filtration precision of 1.2 μm.

The liquid for adjusting viscosity that had gone through circulation filtration and the slurry that had gone through dispersion process were mixed together. The mixture was subjected to dispersion process using a sand mill, so that the viscosity became 50 cp, thereby obtaining a magnetic layer coating. The coating was subjected to circulation filtration for 8 hours using a depth filter having a 95% cut and filtration precision of 1.2 μm.

*) Method for measuring the viscosity: the viscosity at a liquid temperature of 20° C. and a shear rate of 3000 sec⁻¹ was measured using a soliquid meter (type MR-300; manufactured by Rheology Co.).

Coating as a final product

To 100 parts by weight of the coating that had gone through filtration was added 0.8 part by weight of an isocyanate compound (Colonate L, manufactured by Nippon Polyurethane Co.) and stirring was conducted, thereby obtaining a coating for magnetic layer as a final product.

Back-coating Layer
Preparation of a Binder Solution

| Vinyl chloride copolymer | 35 parts |
|---|---|
| Polyester polyurethane resin (containing —SO₃Na group) | 35 parts |
| MEK | 100 parts |
| Toluene | 80 parts |
| Cyclohexanone | 100 parts |

The above-listed components were charged into a hyper mixer and stirred for 6 hours, thereby obtaining a binder solution. The binder solution was subjected to circulation filtration for 8 hours using a depth filter having a 95% cut filtration and precision of 5.0 μm.

Kneading and dispersing process

| Fine particle carbon black (#47B, manufactured by Mitsubishi Chemical Co.) | 100 parts |
|---|---|
| Coarse particle (Sevacarb MT-CI manufactured by Colombian-Carbon Japan) | 1.0 part |
| α-Fe₂O₃ (TF 100, manufactured by Toda Kogyo Co.) | 0.8 part |
| Binder solution | 150 parts |

The above-listed components were charged into a pressure-kneader, and kneading was conducted for 2 hours. After the kneading was completed, the following components were added to the kneaded substance, so that the viscosity became appropriate for dispersion process.

| Binder solution | 200 parts |
|---|---|
| MEK | 135 parts |
| Toluene | 120 parts |
| Cyclohexane | 135 parts |

After they were mixed, dispersion process was conducted using a sand mill, thereby obtaining slurry.
Process for adjusting viscosity

| Binder solution | 66 parts |
|---|---|
| Stearic acid | 1 part |
| Myristic acid | 1 part |
| Butyl stearate | 1 part |
| MEK | 235 parts |
| Toluene | 285 parts |
| Cyclohexanone | 235 parts |

The above-listed components were charged into a hyper mixer and stirred for 1 hour, thereby obtaining a liquid for adjusting viscosity. The liquid for adjusting viscosity was subjected to circulation filtration for 8 hours using a depth filter having a 95% cut and filtration precision of 1.2 μm.

The liquid for adjusting viscosity that had gone through circulation filtration and the slurry which had gone through dispersion process were mixed together. The mixture was subjected to dispersion process using a sand mill, so that the viscosity became 10 cp, thereby obtaining a magnetic layer coating. The coating was subjected to circulation filtration for 8 hours using a depth filter having a 95% cut filtration and precision of 1.2 μm.

*) Method for measuring the viscosity: the viscosity at a liquid temperature of 20° C. and a shear rate of 3000 sec⁻¹ was measured using a soliquid meter (type MR-300; manufactured by Rheology Co.).

Coating paint as a final product

To 100 parts by weight of the coating which has gone through filtration was added 1 part by weight of an isocyanate compound (Colonate L, manufactured by Nippon Polyurethane Co.) and mixing was conducted, thereby obtaining a back-coating paint as a final product.

The above-obtained magnetic coating was applied onto the substrate (1) using extrusion-nozzle coating method, so that the thickness became 1.0 μm when dried. Subsequently, orientation process, drying and calendering process were conducted. On the other side of the magnetic layer, the above-obtained back-coating paint was applied, so that the thickness became 0.5 μm when dried. Subsequently, drying and calendering processing were conducted. The resultant sheet was wound up, thereby obtaining a roll. The obtained roll was subjected to heat-curing process and the roll was slit so that the width of the roll became 8 mm. The obtained roll was assembled into a high band 8 mm video tape cassette.

Example 2

Substantially the same procedure was repeated as in Example 1, except that the substrate (2) having a thickness of 4.0 μm was used instead of the substrate (1) (the substrate (2) can be prepared in substantially the same manner as that for preparing the substrate (1)), and that the thickness of the magnetic layer when dried was changed from 1.0 μm to 1.5 μm.

Example 3

The magnetic coating was applied onto the substrate (3) (which had been prepared in the manner described below and had a thickness of 4.5 μm) using extrusion-nozzle coating method, so that the thickness becomes 1.0 μm when dried. Subsequently, orientation process, drying and calendering process were conducted. As the metallic roll (1) used in calendering process (which contacted with the side of the magnetic layer), a roll having undulations of a pitch of 0.5 mm and a depth of 0.1 μm was used. Except that this roll was used, substantially the same procedure as in Example 1 was repeated.

Method for preparing substrate (3)

Silica particles having a particle size of 40 nm were dispersed into N-methyl-2-pyrrorydone. To the dispersion, 2-chlorparaphenylenediamine and 4,4'-diaminophenyl ether was dissolved. To the resultant solution was added 2-chlorterephthalic acid chloride and the stirring was conducted for 2 hours, and the polymerization was allowed to terminate. Lithium hydroxide was added thereby neutralizing hydrogen chloride, and to the neutralized liquid were added diethanolamine and triethanolamine, thereby obtaining a polymer solution. The concentration of the polymer was adjusted to 11% and the resultant solution was cast onto an endless belt via a die, so that the thickness of the dried substance becomes 4.5 μm. Subsequently, heating process was conducted, thereby evaporating the solvent. The sheet which became to have self-retaining property was removed from the belt. The sheet was neutralized and washed with water. The washed sheet was stretched in the longitudinal direction so that the resultant length became 1.2 times as compared with the original length. The elongated sheet was fixed to a tenter by holding the sides of the sheet and the sheet was stretched in the transverse direction so that the width became 1.2 times as compared with the original width. While maintaining this size, the sheet was hot-air dried at 280° C., thereby obtaining a film. With respect to the obtained film, SRa1 was 12 nm, SRa2 was 10 nm and ΔSRa was 2 nm.

Comparative Example 1

Substantially the same procedure as in Example 3 was repeated except that the metallic roll (1) used in calendering process of the magnetic layer was changed to the roll used in Example 1.

Comparative Example 2

Substantially the same procedure as in Example 3 was repeated except that the metallic roll (1) used in calendering process of the magnetic layer was changed to the metallic roll (2) (which contacted with the side of the magnetic layer) having undulations of a pitch of 3 mm and a depth of 0.03 μm.

Comparative Example 3

Substantially the same procedure as in Example 3 was repeated except that the substrate (1) used in Example 1 was used as the substrate.

Measurement and evaluation

SRa

Measuring device: Surfcorder ET-30 HK (manufactured by Kosaka Laboratory)

With respect to each cassette sample, scanning was conducted 30 times, using the above-mentioned measuring device with a magnification of 10,000, an X pitch of 2 μm, a Y pitch of 10 μm and an X-length of 1,000 μm, thereby determining SRa. Each measurement was conducted under two conditions, i.e. with the cut off of 800 μm and 80 μm.

Running durability test (head clogging)

Measuring device: CCD-TRV85 (VTR manufactured by Sony Co.)

Measuring method: with respect to each of the high band 8 mm video cassettes obtained in Examples and Comparative Examples, 10 cassettes were subjected to aging at 20° C. and 60% RH for 6 hours. Recording was conducted for 120 minutes using the measuring device mentioned above, and reproduction was conducted 20 times. The number of cassette which exhibited decline in RF out put (the decline amount of 3 dB or more for continuous 15 seconds or more), i.e. clogging, was counted.

◎ . . . The number of cassette in which clogging was observed: none

○ . . . The number of cassette in which clogging was observed: 1

Δ . . . The number of cassette in which clogging was observed: 2–3

■ . . . The number of cassette in which clogging was observed: 4 or more

Electromagnetic transducing characteristic (Y-OUT)

Measuring device: TR4171 (a spectrum analyzer manufactured by Takeda Riken) EV-S900 (VTR manufactured by Sony Co.)

Measuring conditions: input signal=50% white signal

Measuring method: with respect to each of the high band 8 mm video cassettes obtained in Examples and Comparative Examples, recording and reproducing was conducted using the above-mentioned measuring device under the above-mentioned conditions. The result obtained in Comparative Example 3 was used as a criterion and the difference from the criterion was compared.

The results of the measurement are shown in Table 1 below.

In Table 1, SRa1 represents SRa (Cutoff: 800 μm).
SRa2 represents SRa (Cutoff: 80 μm).
ΔSRa represents SRa (Cutoff: 800 μm)–SRa (Cutoff: 80 μm).

TABLE 1

|  | Example 1 | Example 2 | Example 3 | Comparative Example 1 | Comparative Example 2 | Comparative Example 3 |
|---|---|---|---|---|---|---|
| SRa1(nm) | 20 | 15 | 25 | 12 | 14 | 30 |
| SRa2(nm) | 12 | 11 | 12 | 12 | 12 | 13 |
| ΔSRa(nm) | 8 | 4 | 13 | 0 | 2 | 17 |
| Clogging | ⊚ | ○ | ⊚ | ■ | Δ | ⊚ |
| Y-OUT(dB) | +1.8 | +1.9 | +1.5 | +2.0 | +1.9 | 0.0 |

Effect of the Invention

As is apparent from Table 1, a magnetic recording medium having a centerplane average roughness (SRa) of the magnetic layer in the range of the present invention is an excellent magnetic recording medium having excellent anti-clogging property and electromagnetic transducing property.

What we claim is:

1. A magnetic recording tape which comprises a nonmagnetic substrate and at least a magnetic layer thereon and has the overall thickness of 7 μm or less, wherein the width of the tape is 6.5 mm or more and the difference in the centerplane average roughness (SRa) of said magnetic layer is in the range defined below:

3 nm≦SRa (Cutoff: 800 μm)−SRa (Cutoff: 80 μm)≦15 nm.

2. The tape according to claim 1, wherein said nonmagnetic substrate is an aromatic polyamide.

3. The tape according to claim 1, wherein said nonmagnetic substrate is an aromatic polyamide comprising 50 mol % or more of the repeating unit represented by the following formula:

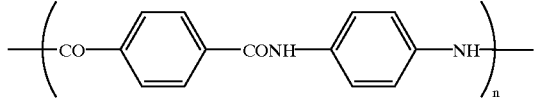

wherein hydrogen atom(s) of the aromatic ring are optionally substituted with substituent(s) selected from the group consisting of a halogen group and a nitro group.

4. The tape according to claim 1, wherein Young's modulus of the nonmagnetic substrate obtained using the aromatic polyamide, as measured at 20° C. and 60% RH, is 19,600 N/mm² or more in terms of the sum of the value measured in longitudinal direction and that measured in transversal direction.

5. The tape according to claim 1, wherein said nonmagnetic substrate is an aromatic polyamide comprising 50 mol % or more of the repeating unit represented by the following formula:

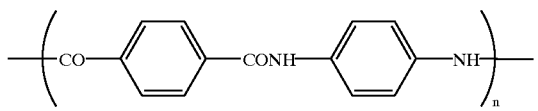

wherein hydrogen atoms(s) of the aromatic ring are substituted with substituents selected from the group consisting of a halogen group and a nitro group.

* * * * *